(12) United States Patent
Qi et al.

(10) Patent No.: US 12,235,450 B1
(45) Date of Patent: Feb. 25, 2025

(54) APPARATUS, SYSTEM, AND METHOD FOR TESTING AND CALIBRATING IMAGE QUALITY OF FIELD-OF-VIEW DISPLAYS WITH PRESCRIPTION LENSES

(71) Applicant: META PLATFORMS TECHNOLOGIES, LLC, Menlo Park, CA (US)

(72) Inventors: Difei Qi, Bellevue, WA (US); Chandra Sekhar Kakani, Fremont, CA (US); Konstantin Kudinov, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 545 days.

(21) Appl. No.: 17/721,754

(22) Filed: Apr. 15, 2022

Related U.S. Application Data

(60) Provisional application No. 63/241,843, filed on Sep. 8, 2021.

(51) Int. Cl.
  *G02B 27/00* (2006.01)
  *G02B 7/02* (2021.01)
  *G02B 13/22* (2006.01)
  *G02B 27/01* (2006.01)

(52) U.S. Cl.
  CPC ......... *G02B 27/0172* (2013.01); *G02B 7/021* (2013.01); *G02B 13/22* (2013.01); *G02B 27/0025* (2013.01); *G02B 2027/011* (2013.01); *G02B 2027/0178* (2013.01)

(58) Field of Classification Search
  CPC .... G02B 27/0172; G02B 7/021; G02B 13/22; G02B 13/002; G02B 1/041; G02B 3/06; G02B 27/0025; G02B 2027/011; G02B 2027/0178; G02B 27/0966; G02B 2027/013
  See application file for complete search history.

(56) References Cited

U.S. PATENT DOCUMENTS

| | | | | |
|---|---|---|---|---|
| 5,648,871 A | * | 7/1997 | Okuyama | G02B 13/08 359/557 |
| 2012/0320463 A1 | * | 12/2012 | Shabtay | G02B 13/0045 359/648 |
| 2018/0045909 A1 | * | 2/2018 | Platt | G02B 7/023 |

\* cited by examiner

*Primary Examiner* — Mustak Choudhury
(74) *Attorney, Agent, or Firm* — Greenberg Traurig, LLP

(57) ABSTRACT

An imaging camera device comprising (1) an image sensor, (2) a spherical-power adapter coupled to the image sensor, wherein the spherical-power adapter moves the image sensor relative to an imaging lens, (3) a field-curvature adapter coupled to at least one optical component placed between the image sensor and the imaging lens, wherein the field-curvature adapter adjusts the size of a variable air gap formed between the optical component and at least one additional optical component, and (4) a cylindrical-power adapter that includes a plurality of cylindrical correction lenses applied to a wheel configured to rotate in at least one direction. Various other apparatuses, systems, and methods are also disclosed.

20 Claims, 9 Drawing Sheets

Method 500

Start

Couple an image sensor to a spherical-power adapter that facilitates moving the image sensor relative to an imaging lens within a telecentric lens stack
510

Couple at least one optical component to a field-curvature adapter that facilitates adjusting the size of a variable air gap formed between the optical component and at least one additional optical component
520

Place the optical component between the image sensor and the imaging lens within the telecentric lens stack
530

Configure, within the telecentric lens stack, a cylindrical-power adapter that includes a plurality of cylindrical correction lenses applied to a wheel that rotates in at least one direction
540

End

*FIG. 5*

Cylindrical-Power Adapter
108

APPARATUS, SYSTEM, AND METHOD FOR TESTING AND CALIBRATING IMAGE QUALITY OF FIELD-OF-VIEW DISPLAYS WITH PRESCRIPTION LENSES

INCORPORATION BY REFERENCE

This application claims the benefit of priority under 35 U.S.C. § 119 (e) to U.S. Provisional Application No. 63/241,843 filed Sep. 8, 2021, the contents of which are incorporated herein by reference in their entirety.

BRIEF DESCRIPTION OF DRAWINGS

The accompanying drawings illustrate a number of exemplary embodiments and are parts of the specification. Together with the following description, the drawings demonstrate and explain various principles of the instant disclosure.

FIG. 5 is a flowchart of an exemplary method for testing and calibrating image quality of field-of-view displays with prescription lenses according to one or more embodiments of this disclosure.

Figure 1:
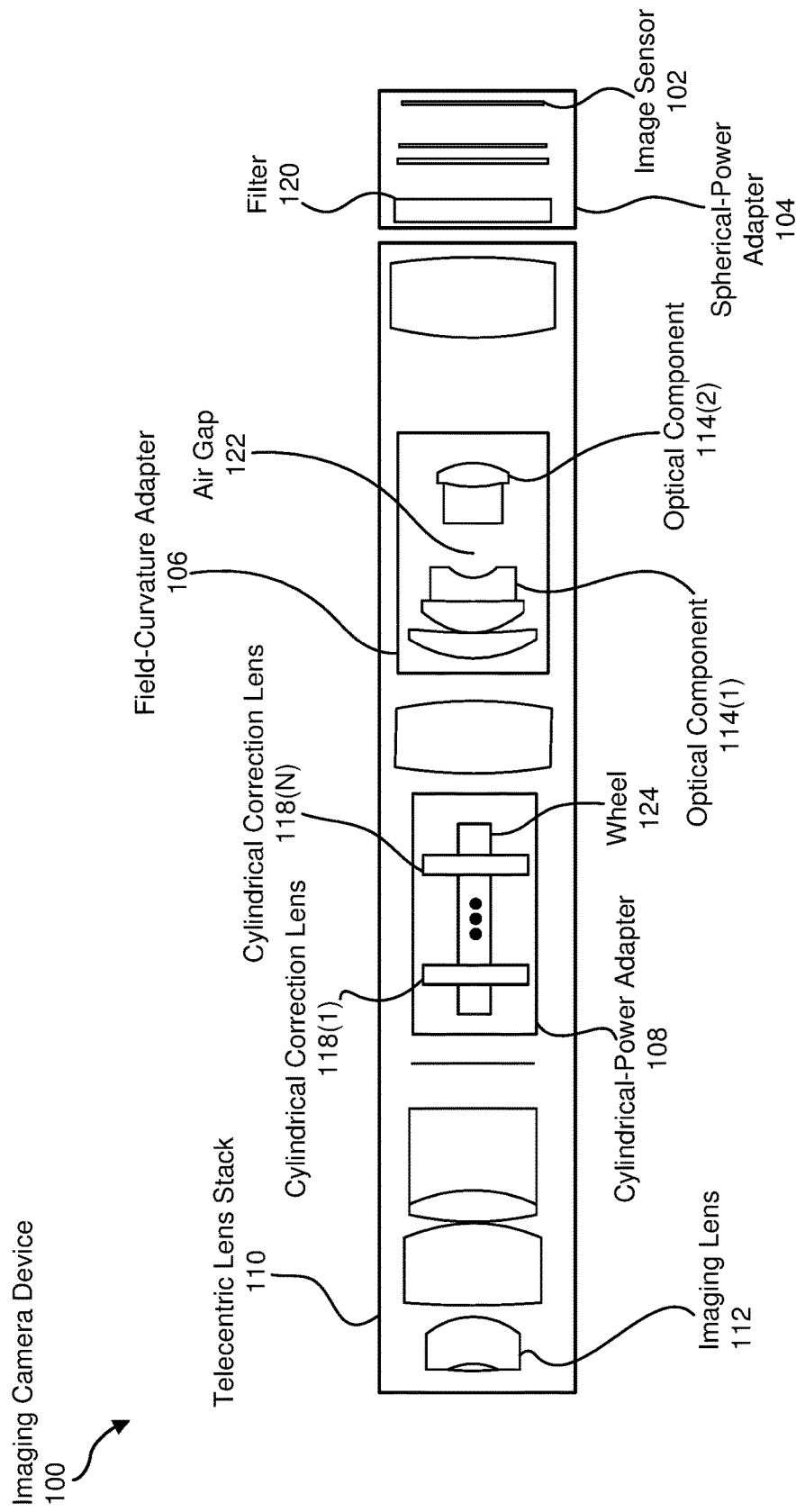
FIG. 1 is an illustration of an exemplary imaging camera device that facilitates testing and calibrating image quality of field-of-view displays with prescription lenses according to one or more embodiments of this disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION

The present disclosure is generally directed to apparatuses, systems, and methods for testing and calibrating image quality of field-of-view displays with prescription lenses. As will be explained in greater detail below, these apparatuses, systems, and methods may provide numerous features and benefits.

Imaging cameras and/or lenses may simulate and/or mimic the field of view of a human eye for optical metrology and calibration purposes in connection with head-mounted displays (e.g., artificial-reality devices, augmented-reality devices, and/or virtual-reality devices) under testing. Unfortunately, multiple imaging cameras and/or lenses may be needed to collectively measure and/or calibrate different aspects of display uniformity (e.g., brightness, sharpness, and/or angular uniformity) in head-mounted displays (HMDs) whose image output is modified by prescription lenses. The need for multiple imaging cameras and/or lenses in testing and/or calibrating HMDs with prescription lenses may be inconvenient, costly, and/or inefficient for manufacturers and/or vendors of such display equipment. The instant disclosure, therefore, identifies and addresses a need for additional apparatuses, systems, and methods for testing and calibrating image quality of field-of-view displays with prescription lenses.

In some examples, a single imaging camera system may replace multiple imaging cameras and/or lenses that were previously needed to collectively measure and/or calibrate different aspects of display uniformity for HMDs. In other words, such an imaging camera system may itself perform all the measurement and/or calibration functions of those conventional imaging cameras and/or lenses, thereby eliminating the need for multiple imaging cameras and/or lenses in the measurement and/or calibration process.

In some examples, the imaging camera system may include (1) an image sensor, (2) a spherical-power adapter that involves moving the image sensor closer to or further from an imaging lens that receives an illuminated image toward the image sensor, (3) a field-curvature and/or magnification adapter that adjusts the size of the air gap formed by a plurality of optical components placed between the imaging lens and the image sensor, and/or (4) a cylindrical-power and/or cylindrical-axes adapter that involves cylindrical correction lenses applied to a wheel capable of spinning in at least one direction. In one example, this imaging camera system may include and/or represent a telecentric lens configuration, stack, and/or block that facilitates maintaining the same image height and/or width when adapting to various spherical powers and/or cylindrical powers or axes.

In some examples, the telecentric lens configuration, stack, and/or block may include and/or represent various optical components through which light, radiation, and/or illuminated images pass, cross, and/or reflect. In one example, the image sensor may include and/or represent one or more charge-coupled devices (CCDs). In other examples, the image sensor may include and/or represent one or more active-pixel sensors and/or complementary metal-oxide semiconductor (CMOS) sensors.

In some examples, the imaging camera system may interface with and/or be used to evaluate and/or analyze the image displayed and/or outputted by HMDs. In such examples, the imaging camera system may serve as a tool to facilitate correcting the image displayed by certain HMDs that have been modified by prescription lenses. For example, the imaging camera system may be able to measure and/or calibrate HMDs that are designed to accommodate and/or correct nearsightedness, farsightedness, and/or astigmatism. In this example, the imaging camera system may evaluate and/or analyze the quality of the images displayed and/or outputted by the HMDs. The quality of such images may involve and/or take into account the brightness, contrast, and/or sharpness (among other characteristics) of the HMDs. The imaging camera system may also provide data and/or feedback used to calibrate the HMDs based at least in part on the quality of the images.

In some examples, the spherical-power adapter may facilitate the physical movement of the image sensor back and forth relative to the imaging lens. For example, the spherical-power adapter may include and/or represent a mechanical apparatus that shifts the image sensor closer to and/or further from the imaging lens. By doing so, the spherical-power adapter may enable the imaging camera system to modify, change, and/or adapt the spherical powers of the image presented by the HMDs and/or the imaging lens. Additionally or alternatively, the spherical-power adapter may enable the imaging camera system to adapt to and/or compensate for the spherical powers of the prescription lenses incorporated into such HMDs.

In some examples, the field-curvature and/or magnification adapter may serve to adjust the size of the air gap formed by certain optical components placed between the imaging lens and the image sensor. For example, the field-curvature and/or magnification adapter may include and/or represent a mechanical apparatus that expands and/or contracts the air gap between those optical components. By doing so, the field-curvature and/or magnification adapter may enable the imaging camera system to modify, change, and/or adapt the field curvature and/or magnification of the image that potentially results from the adaptation to the spherical powers. Additionally or alternatively, the field-curvature and/or magnification adapter may enable the imaging camera system to adapt to and/or compensate for the potential field curvature and/or magnification imparted to the image by the prescription lenses incorporated into such HMDs and/or the adaptation to the spherical powers.

In some examples, the cylindrical-power and/or cylindrical-axes adapter may involve applying and/or securing cylindrical correction lenses to a wheel capable of spinning in at least one direction. For example, the cylindrical-power and/or cylindrical-axes adapter may include and/or represent a mechanical apparatus that holds and/or maintains the cylindrical correction lenses in place between the image sensor and the imaging lens. Additionally or alternatively, the cylindrical-power and/or cylindrical-axes adapter may include and/or represent a wheel and/or rotator to which the cylindrical correction lenses are coupled and/or attached. The cylindrical-power and/or cylindrical-axes adapter may also cause the wheel and/or rotator to spin and/or rotate with the lenses within the imaging camera system.

By doing so, the cylindrical-power and/or cylindrical-axes adapter may enable the imaging camera system to modify, change, and/or adapt to the cylindrical powers of the image presented by the HMDs and/or the imaging lens. Additionally or alternatively, the cylindrical-power and/or cylindrical-axes adapter may enable the imaging camera system to adapt to and/or compensate for the cylindrical powers and/or cylindrical axes of the prescription lenses incorporated into such HMDs. Accordingly, the cylindrical correction lenses may adapt to and/or compensate for the cylindrical powers imparted by the prescription lenses, and the rotation of the cylindrical lenses may adapt to and/or compensate for the cylindrical axes of the prescription lenses.

In some examples, the imaging camera system may include the spherical-power adapter positioned and/or placed nearest to and/or proximate to the image sensor. In such examples, the imaging camera system may include the field-curvature and/or magnitude adapter positioned and/or placed next to the spherical-power adapter opposite the image sensor. Additionally or alternatively, the imaging camera system may include the cylindrical-power and/or cylindrical-axes adapter positioned and/or placed next to the field-curvature and/or magnitude adapter opposite the spherical-power adapter. Finally, the imaging lens that receives and/or accepts an illuminated image from an HMD into the imaging camera system may be positioned and/or placed next to the cylindrical-power and/or cylindrical-axes adapter when that HMD undergoes testing, optical metrology, and/or calibration.

In other examples, the imaging camera system may include the spherical-power adapter positioned and/or placed nearest to and/or proximate to the image sensor. In such examples, the imaging camera system may include the field-curvature and/or magnitude adapter positioned and/or placed next to the spherical-power adapter opposite the image sensor. Additionally or alternatively, the imaging camera system may include the cylindrical-power and/or cylindrical-axes adapter positioned and/or placed within the air gap formed in the field-curvature and/or magnitude adapter. Finally, the imaging lens that receives and/or accepts an illuminated image from an HMD into the imaging camera system may be positioned and/or placed proximate to the field-curvature and/or magnitude adapter when that HMD undergoes testing, optical metrology, and/or calibration.

The following will provide, with reference to FIGS. 1-4, 6, and 7, detailed descriptions of exemplary devices, systems, components, and corresponding implementations for testing and calibrating image quality of field-of-view displays with prescription lenses. In addition, detailed descriptions of methods for testing and calibrating image quality of field-of-view displays with prescription lenses in connection with FIG. 5. The discussion corresponding to FIGS. 8 and 9 will provide detailed descriptions of types of exemplary artificial-reality devices, wearables, and/or associated systems that may support and/or contribute to testing and calibrating image quality of field-of-view displays with prescription lenses.

FIG. 1 illustrates an exemplary imaging camera device 100 that facilitates and/or supports testing and/or calibrating image quality of field-of-view displays with prescription lenses. As illustrated in FIG. 1, exemplary imaging camera device 100 may include and/or represent a telecentric lens stack 110 that consists of various optical components. For example, telecentric lens stack 110 may include and/or represent a field-curvature adapter 106 and/or a cylindrical-power adapter 108. In some examples, telecentric lens stack 110 may also include and/or represent a spherical-power adapter 104 and/or an image sensor 102. In other examples, spherical-power adapter 104 and/or image sensor 102 may be separate and/or distinct from telecentric lens stack 110. In certain embodiments, imaging camera device 100 may constitute and/or represent a single unit.

In some examples, spherical-power adapter 104 may be physically, directly, indirectly, and/or optically coupled to image sensor 102. In one example, spherical-power adapter 104 may move, adjust, and/or position image sensor 102 relative to an imaging lens 112. In some examples, field-curvature adapter 106 may be physically and/or optically coupled to an optical component 114(1) and/or an optical component 114(2) placed between image sensor 102 and imaging lens 112. In one example, field-curvature adapter 106 may adjust, modify, and/or change the size of a variable air gap 122 formed between optical components 114(1) and 114(2).

In some examples, cylindrical-power adapter 108 may be physically and/or optically coupled to one or more optical components within telecentric lens stack 110. In one example, cylindrical-power adapter 108 may include and/or represent cylindrical correction lenses 118(1)-(N) applied to a wheel 124 configured to rotate and/or spin in one or more directions. In certain embodiments, cylindrical correction lenses 118(1)-(N) may be independently rotatable and/or spinnable relative to one another. Additionally or alternatively, cylindrical correction lenses 118(1)-(N) may be rotatable and/or spinnable together by wheel 124.

In some examples, optical components included and/or represented in telecentric lens stack 110 may perform and/or support one or more functions, including image scaling, lens correction, polarization, reflection, retardation, optical aberration correction, gamma correction and/or adjustment, multi-image blending and/or overlaying, display overdrive compensation, Mura correction, dithering, image decompression, noise correction, image distortion, contrasting, and/or sharpening, among other functions. Examples of such optical components include, without limitation, lenses, quarter wave plates, reflectors, polarizers, retarders, partial reflectors, reflective polarizers, optical films, compensators, beam splitters, alignment layers, color filters, protection sheets, glass components, plastic components, apertures, Fresnel lenses, convex lenses, concave lenses, filters, spherical lenses, cylindrical lenses, compensators, coatings, combinations or variations of one or more of the same, and/or any other suitable optical components.

In some examples, the optical components may include and/or contain a variety of different materials. Examples of such materials include, without limitation, plastics, glasses (e.g., crown glass), polycarbonates, combinations or variations of one or more of the same, and/or any other suitable materials. The optical components may be defined and/or formed in a variety of shapes and/or sizes.

In some examples, spherical-power adapter 104 may include and/or represent image sensor 102 and/or a filter 120. In one example, filter 120 may selectively transmit and/or reject certain portions and/or wavelengths of the optical spectrum. Examples of image sensor 102 include, without limitation, charge-coupled devices (CCDs), active-pixel sensors, complementary metal-oxide semiconductor (CMOS) sensors, combinations and/or variations of one or more of the same, and/or any other suitable image sensor.

In some examples, imaging camera device 100 may include and/or represent one or more additional components, devices, and/or mechanisms that are not necessarily illustrated and/or labelled in FIG. 1. For example, telecentric lens stack 110 may include and/or represent one or more additional lenses that are not necessarily illustrated and/or labelled in FIG. 1. In another example, spherical-power adapter 104 may include and/or represent one or more additional filters that are not necessarily illustrated and/or labelled in FIG. 1. Moreover, although not necessarily illustrated and/or labelled in this way in FIG. 1, imaging camera device 100 may include and/or represent additional optical components, circuitry, processors, memory devices, cabling, connectors, springs, motors, and/or actuators, among other components. In other examples, imaging camera device 100 may exclude and/or omit one or more of the components, devices, and/or mechanisms that are illustrated and/or labelled in FIG. 1.

In some examples, telecentric lens stack 110 may include and/or represent a configuration and/or block that facilitates maintaining the same image height and/or width when adapting to various spherical powers and/or cylindrical powers or axes. In one example, telecentric lens stack 110 may include and/or represent imaging lens 112, cylindrical-power adapter 108, field-curvature adapter 106, spherical-power adapter 104, image sensor 102, and/or other optical components.

In some examples, spherical-power adapter 104 of imaging camera device 100 may be positioned and/or placed nearest to and/or proximate to image sensor 102. In such examples, field-curvature adapter 106 of imaging camera device 100 may be positioned and/or placed next to spherical-power adapter 104 opposite image sensor 102. Additionally or alternatively, cylindrical-power adapter 108 of imaging camera device 100 may be positioned and/or placed next to field-curvature adapter 106 opposite spherical-power adapter 104. Finally, imaging lens 112, which receives and/or accepts an illuminated image from an HMD with prescription lenses, may be positioned and/or placed next to cylindrical-power adapter 108 when that HMD undergoes testing, optical metrology, and/or calibration.

In some examples, spherical-power adapter 104 may be configured and/or designed to modify an image presented by an HMD that is optically coupled to telecentric lens stack 110 by moving image sensor 102 relative to imaging lens 112. In one example, the HMD may be fitted and/or equipped with one or more prescription lenses. In this example, the modification made by spherical-power adapter 104 to the image may at least partially compensate and/or account for the spherical power of the prescription lens through which the image passed prior to reaching telecentric lens stack 110. For example, by moving image sensor 102 closer to or further from imaging lens 112, spherical-power adapter 104 may increase or decrease the amount of spherical-power correction and/or compensation applied to the image prior to reaching image sensor 102. Accordingly, spherical-power adapter 104 may adjustably compensate and/or account for the spherical power of the prescription lens while the image quality of the HMD is tested and/or calibrated.

In some examples, field-curvature adapter 106 may be configured and/or designed to modify an image presented by an HMD that is optically coupled to telecentric lens stack 110 by adjusting the size of air gap 122 formed between optical component 114(1) and optical component 114(2). In one example, the modification made by field-curvature adapter 106 to the image may at least partially compensate and/or account for the magnification and/or field-curvature change that occurred upon passing through the prescription lens fitted to the HMD prior to reaching telecentric lens stack 110. For example, by adjusting the size of air gap 122, field-curvature adapter 106 may increase and/or decrease the amount of magnification and/or field-curvature correction and/or compensation applied to the image prior to reaching image sensor 102. Accordingly, field-curvature adapter 106 may adjustably compensate and/or account for the magnification and/or field-curvature change produced by the prescription lens while the image quality of the HMD is tested and/or calibrated.

In some examples, cylindrical-power adapter 108 may be configured and/or designed to modify an image presented by an HMD that is optically coupled to telecentric lens stack 110 by adjusting an axis of at least one of cylindrical correction lenses 118(1)-(N) applied to wheel 124. Additionally or alternatively, cylindrical-power adapter 108 may be configured and/or designed to modify an image presented by an HMD that is optically coupled to telecentric lens stack 110 by rotating and/or spinning at least one of cylindrical correction lenses 118(1)-(N) applied to wheel 124. In one example, the modification made by cylindrical-power adapter 108 to the image may at least partially compensate and/or account for the cylindrical power and/or cylindrical axis of the prescription lens through which the image passed prior to reaching telecentric lens stack 110. For example, by adjusting axes of cylindrical correction lenses 118(1)-(N), cylindrical-power adapter 108 may increase and/or decrease the amount of cylindrical power and/or cylindrical axis correction and/or compensation applied to the image prior to reaching image sensor 102. Accordingly, cylindrical-power adapter 108 may adjustably compensate and/or account for the cylindrical-power and/or cylindrical-axis change produced by the prescription lens while the image quality of the HMD is tested and/or calibrated.

Figure 6:
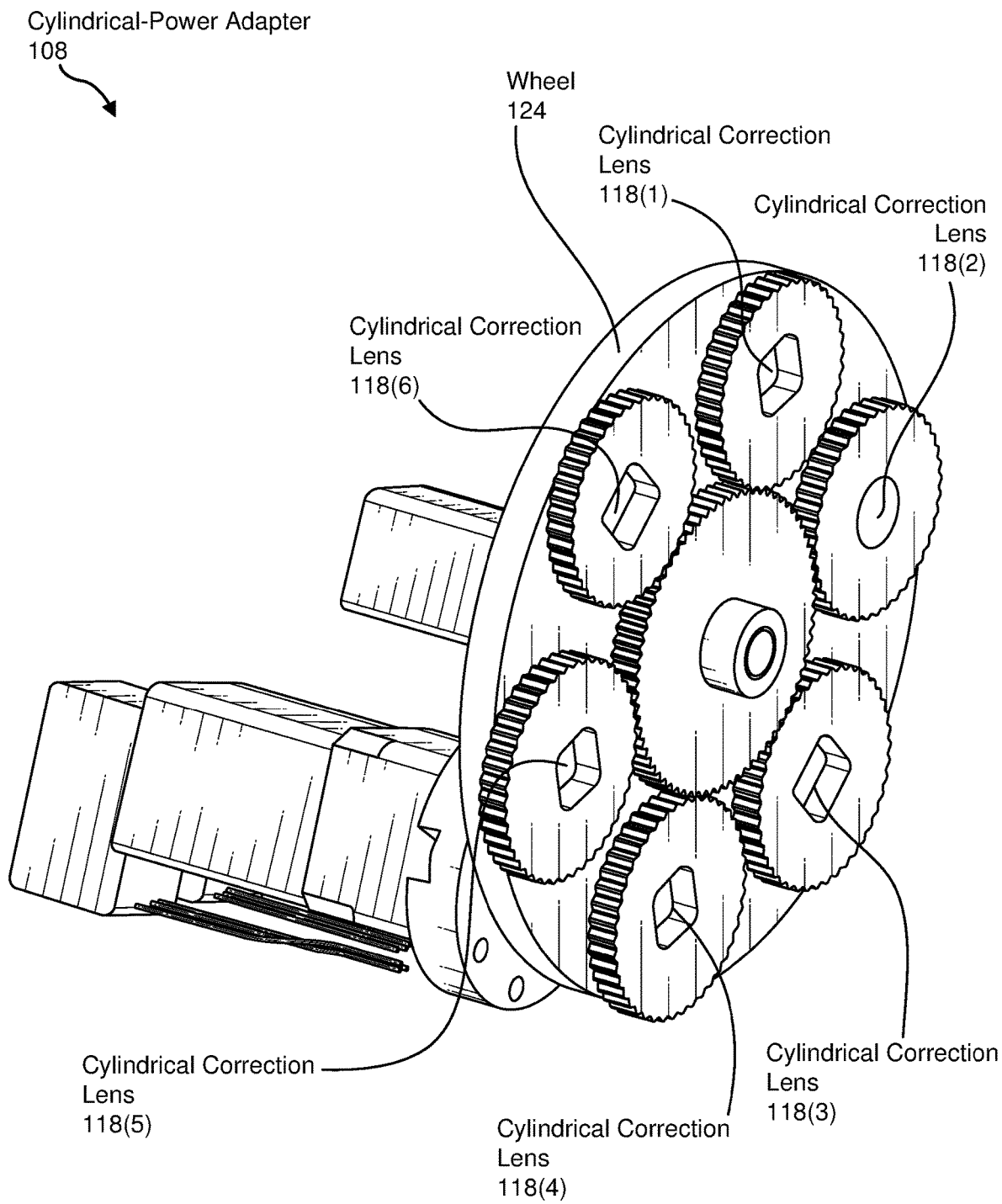
FIG. 6 is an illustration of an exemplary cylinder-power adapter incorporated in an imaging camera device according to one or more embodiments of this disclosure.
Figure 7:
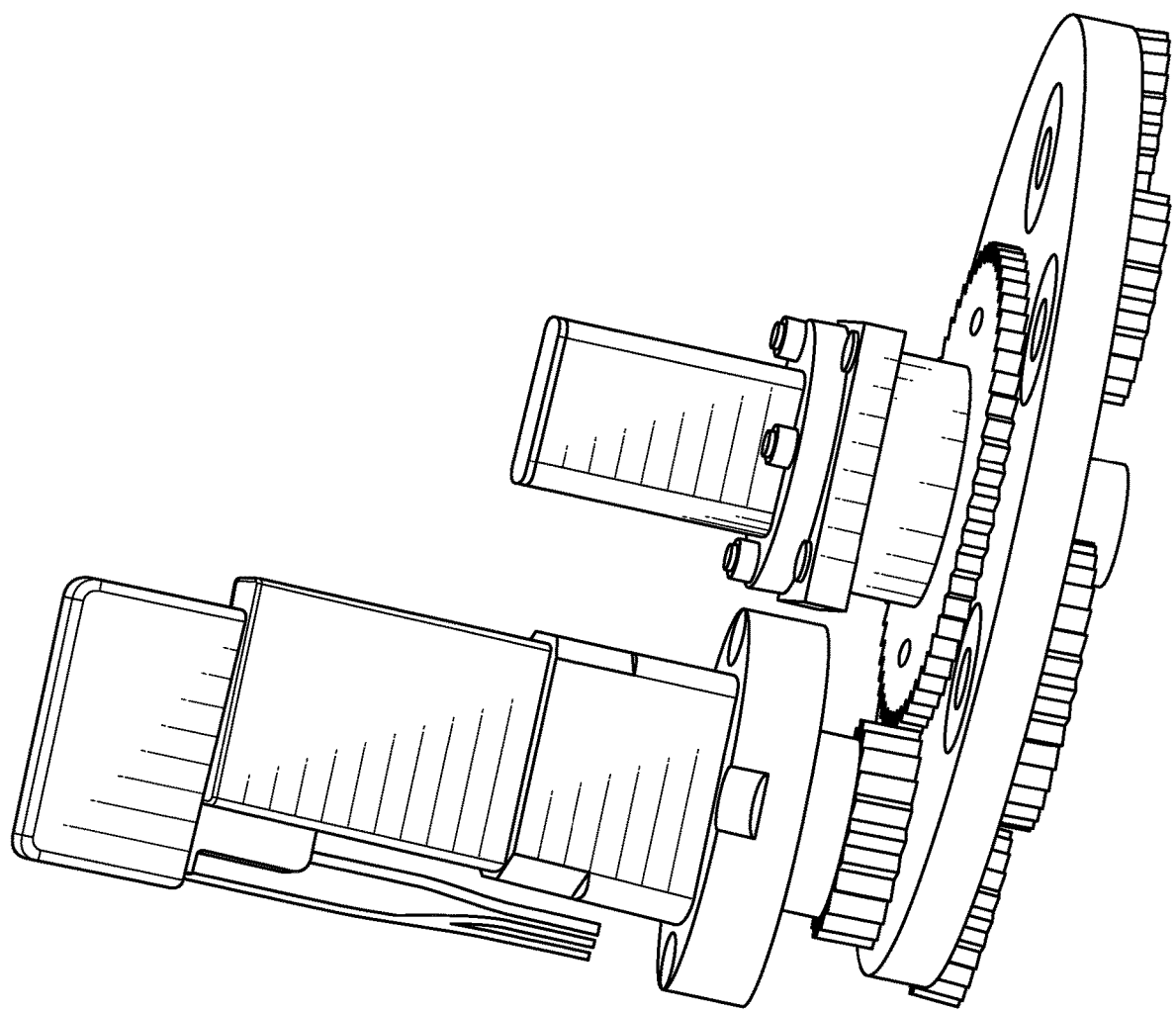
FIG. 7 is an illustration of an exemplary cylinder-power adapter incorporated in an imaging camera device according to one or more embodiments of this disclosure.

FIGS. 6 and 7 illustrate an exemplary implementation of cylindrical-power adapter 108 that includes and/or represents cylindrical correction lenses 118(1), 118(2), 118(3), 118(4), 118(5), and/or 118(6) applied to wheel 124. In some examples, wheel 124 may rotate in one direction or another to facilitate selecting and/or applying one of cylindrical correction lenses 118(1)-(6) to the image presented by the HMD being tested and/or calibrated. In one example, cylindrical correction lenses 118(1)-(6) may be incorporated into slots for cylindrical power adaptation. Additionally or alternatively, each of cylindrical correction lenses 118(1)-(6) may be rotated by its optical axis for adaption to different cylindrical axes. As illustrated in FIGS. 6 and 7, cylindrical-power adapter 108 may include and/or represent one or more rotation mechanisms that facilitate the rotation and/or movement of wheel 124 and/or cylindrical correction lenses 118(1)-(6) for adaptation purposes. Such rotation mechanisms may include and/or represent various motors (e.g., stepper motors) and/or gears, among other components, features, and/or devices.

In some examples, cylindrical correction lenses 118(1)-(N) may be positioned and/or located between imaging lens 112 and air gap 122 formed between optical components 114(1) and 114(2) within telecentric lens stack 110. In one example, imaging lens 112 included in telecentric lens stack 110 may be optically coupled directly to an HMD undergoing testing and/or calibration in connection with prescription lenses. In this example, the optical coupling between the HMD and imaging lens 112 may enable imaging lens to receive and/or accept the image directly from the HMD. Additionally or alternatively, image sensor 102 may be positioned and/or located proximate to air gap 122 formed by optical components 114(1) and 114(2) within telemetric lens stack 110. Image sensor 102 may be positioned and/or located opposite the HMD relative to telecentric lens stack 110.

In some examples, image sensor 102 may detect image 204 after passing through telecentric lens stack 110. In such examples, image sensor 102 may generate data representative of image 204 as modified by the various adapters included in imaging camera device 100. In one example, image sensor 102 may record and/or store the data representative of image 204 for evaluation and/or analysis. In another example, image sensor 102 may provide the data representative of image 204 to an evaluation tool and/or device. In a further example, image sensor 102 may transmit the data representative of image 204 to another computing device for further processing and/or evaluation.

In some examples, image sensor 102 may provide the data representative of image 204 to a monitor for viewing and/or evaluation by a technician. In one example, the technician may tweak and/or adjust the settings on cylindrical-power adapter 108, field-curvature adapter 106, and/or spherical-power adapter 104 based at least in part on the data representative of image 204. Additionally or alternatively, the technician may tweak, adjust, and/or replace one or more features of display device 202 (including, e.g., the prescription lens) based at least in part on the data representative of image 204. For example, the technician may modify and/or change the brightness, contrast, and/or sharpness (among other characteristics) of display device 202.

Figure 2:
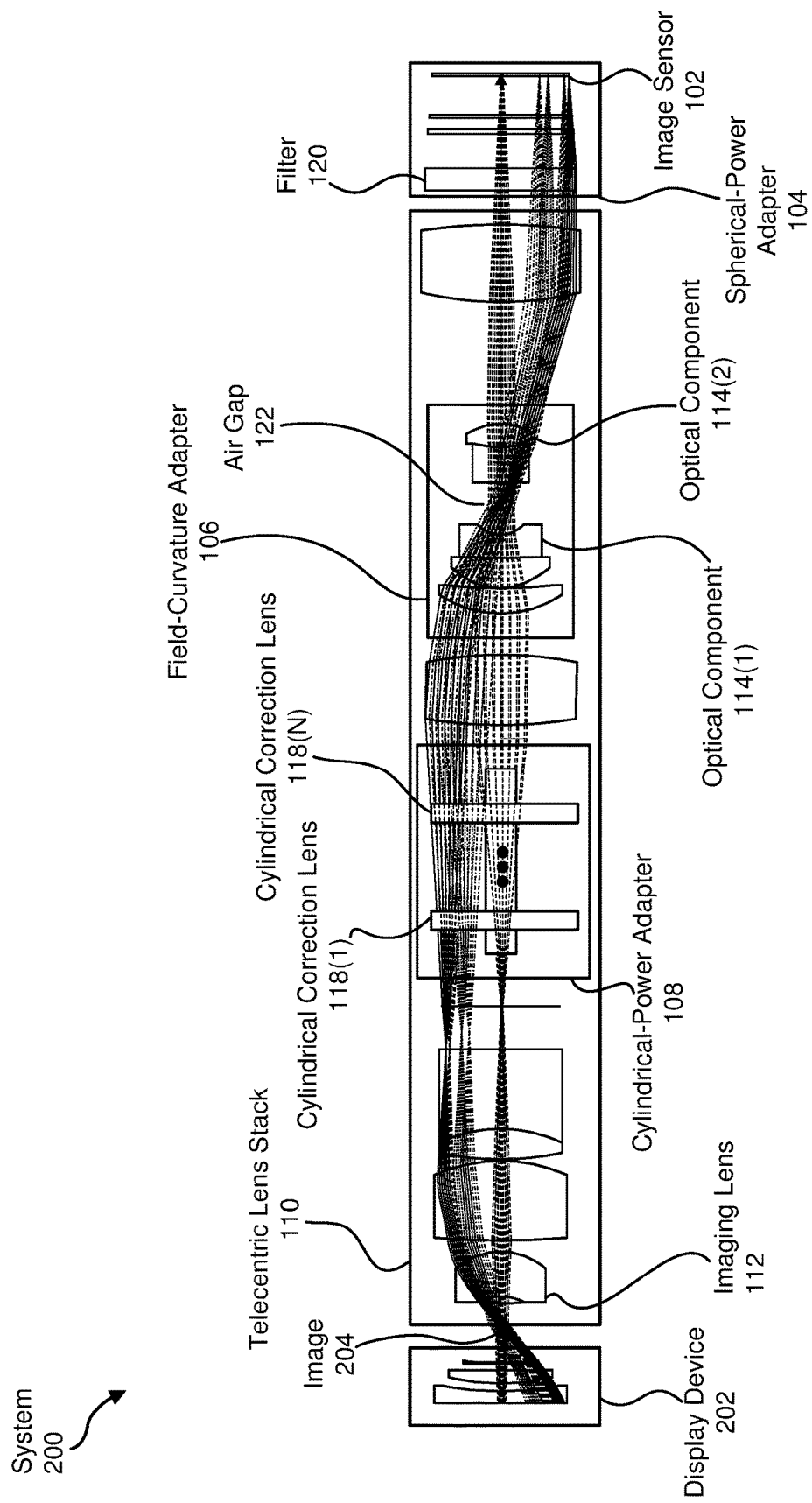
FIG. 2 is an illustration of an exemplary system for testing and calibrating image quality of field-of-view displays with prescription lenses according to one or more embodiments of this disclosure.

FIG. 2 illustrates an exemplary system 200 that facilitates and/or supports testing and/or calibrating the image quality of a display device 202 with one or more prescription lenses. As illustrated in FIG. 2, exemplary system 200 may include and/or represent display device 202 and/or a certain implementation of imaging camera device 100 (although not necessarily labelled in FIG. 2). In some examples, imaging camera device 100 may be physically and/or optically coupled to display device 202. In such examples, display device 202 may produce, project, and/or emit an image 204, and imaging camera device 100 may receive and/or detect image 204 from display device 202 for testing and/or calibrating the quality of image 204.

In some examples, image 204 may include and/or represent light and/or electromagnetic radiation. In one example, image 204 may include and/or represent a pattern of light whose frequency and/or wavelength fall within the visible portion of the electromagnetic spectrum. In this example, the pattern of light may be able to convey and/or communicate one or more visible and/or graphical representations or components to a user operating display device 202. Similarly, this pattern of light may be able to convey and/or communicate one or more visible and/or graphical representations or components to imaging camera device 100 as display device 202 undergoes testing, optical metrology, and/or calibration.

In some examples, display device 202 may include and/or represent an HMD fitted and/or equipped with prescription lenses that modify image 204 prior to reaching telecentric lens stack 110 of imaging camera device 100. Examples of display device 202 include, without limitation, artificial-reality devices, augmented-reality devices, virtual-reality devices, mixed-reality devices, hybrid-reality devices, combinations or variations of one or more of the same, and/or any other suitable display device 202.

Figure 3:
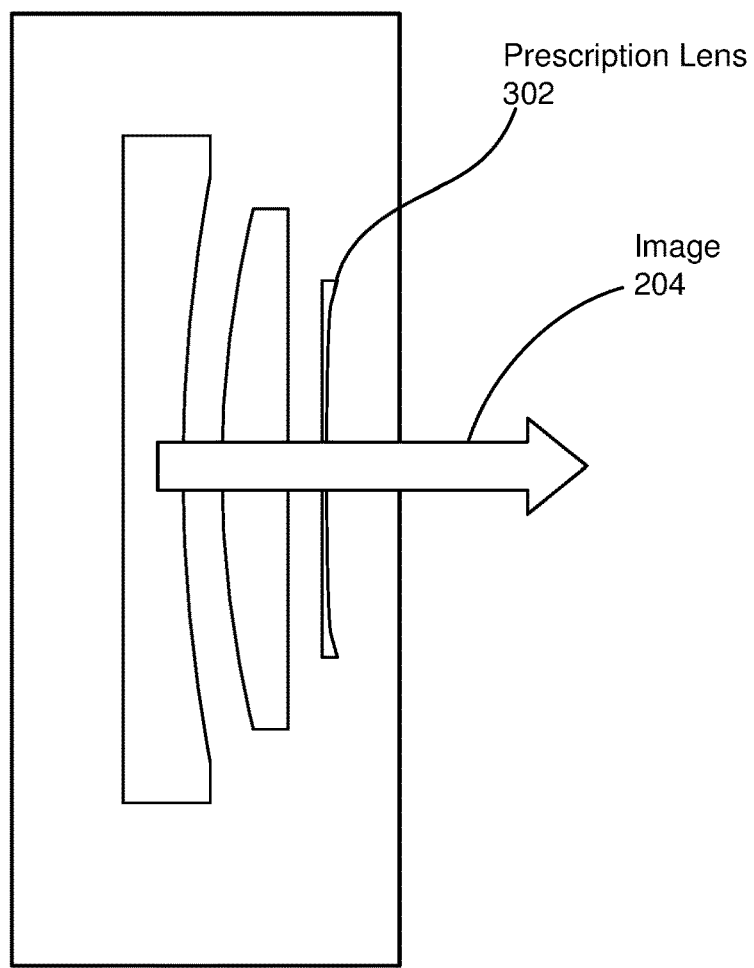
FIG. 3 is an illustration of an exemplary display device whose image quality is tested and/or calibrated via imaging camera devices according to one or more embodiments of this disclosure.

FIG. 3 illustrates an exemplary implementation of display device 202 that produces, projects, and/or emits image 204 for evaluation and/or analysis. As illustrated in FIG. 3, display device 202 may include and/or incorporate a prescription lens 302 through which image 204 passes and/or travels prior to reaching imaging camera device 100. In some examples, prescription lens 302 may be tailored to and/or personalized for one or more users of display device 202. In such examples, prescription lens 302 may compensate and/or account for imperfections and/or deficiencies in the vision of those users (much like prescription glasses).

In some examples, prescription lens 302 may modify, alter, and/or change image 204 to compensate for refractive errors experienced by those users. Examples of such refractive errors include, without limitation, myopia, hypermetropia, astigmatism, presbyopia, combinations or variations of one or more of the same, and/or any other vision imperfections and/or deficiencies. To accurately test and/or calibrate the quality of image 204 after passing through prescription lens 302, image 204 may undergo further modification by various adapters included in imaging camera device 100 before reaching image sensor 102. In certain embodiments, prescription lens 302 may include and/or represent any type or form of corrective lens and/or transmissible optical device. Accordingly, prescription lens 302 is not necessarily limited to corrective lenses and/or transmissible optical devices prescribed by a physician and/or doctor (such as an ophthalmologist and/or optometrist).

Figure 4:
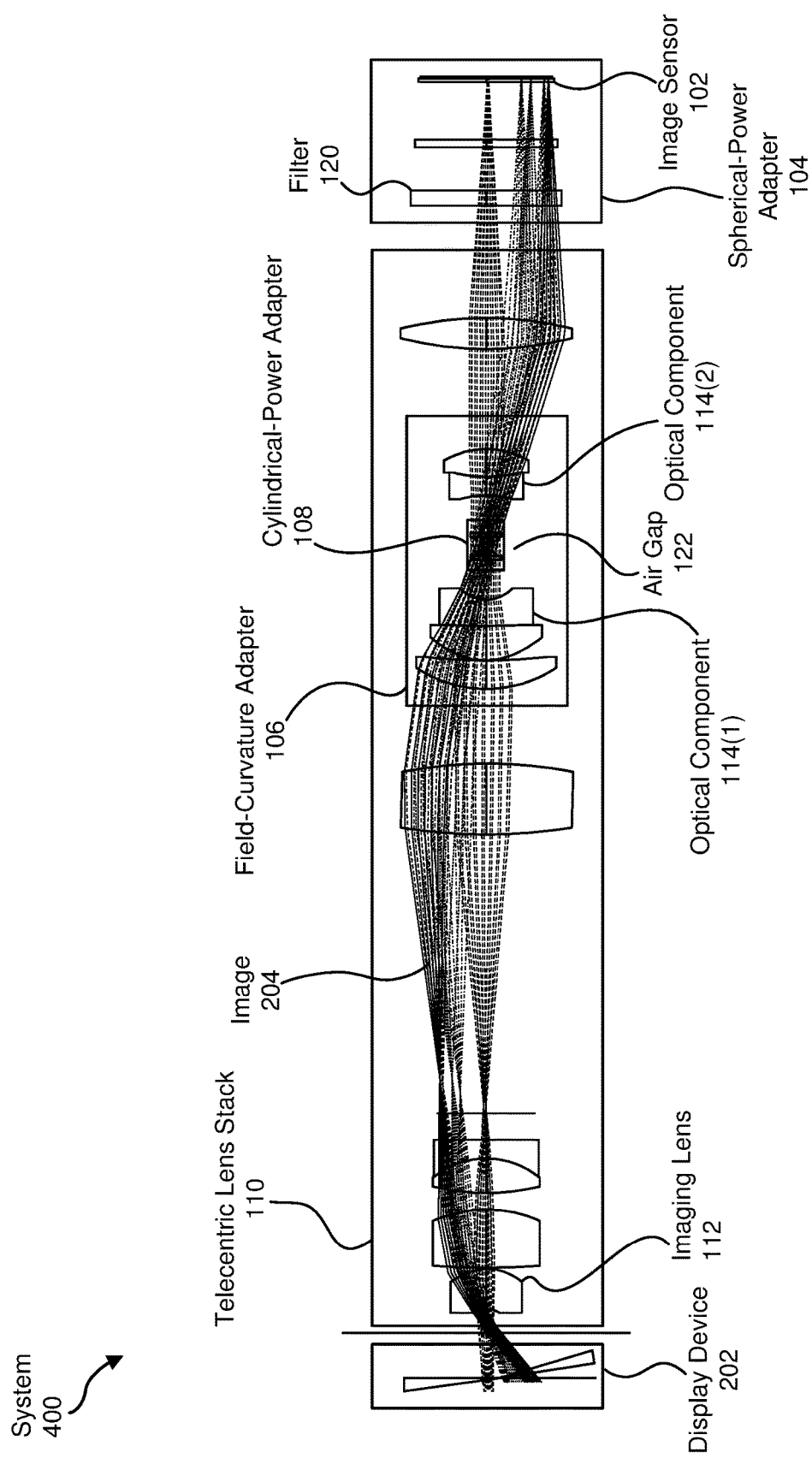
FIG. 4 is an illustration of an exemplary system for testing and calibrating image quality of field-of-view displays with prescription lenses according to one or more embodiments of this disclosure.

FIG. 4 illustrates an exemplary system 400 that facilitates and/or supports testing and/or calibrating the image quality of display device 202. As illustrated in FIG. 4, exemplary system 400 may include and/or represent display device 202 and/or a certain implementation of imaging camera device 100 (although not necessarily labelled in FIG. 2). In some examples, imaging camera device 100 may be physically and/or optically coupled to display device 202. In such examples, display device 202 may produce, project, and/or emit an image 204, and imaging camera device 100 may receive and/or detect image 204 from display device 202 for testing and/or calibrating the quality of image 204.

In some examples, spherical-power adapter 104 of imaging camera device 100 may be positioned and/or placed nearest to and/or proximate to image sensor 102. In such examples, field-curvature adapter 106 of imaging camera device 100 may be positioned and/or placed next to spherical-power adapter 104 opposite image sensor 102. Additionally or alternatively, cylindrical-power adapter 108 of imaging camera device 100 may be positioned and/or placed within air gap 122 formed between optical components 114(1) and 114(2) of field-curvature adapter 106. Finally, imaging lens 112, which receives and/or accepts image 204 from display device 202, may be positioned and/or placed proximate to display device 202 when undergoing testing, optical metrology, and/or calibration.

FIG. 5 is a flow diagram of an exemplary method 500 for manufacturing and/or assembling an imaging camera device that facilitates testing and calibrating image quality of field-of-view displays with prescription lenses. Additionally or alternatively, the steps shown in FIG. 5 may incorporate and/or involve various sub-steps and/or variations consistent with the descriptions provided above in connection with FIGS. 1-4.

As illustrated in FIG. 5, method 500 may include and/or involve the step of coupling an image sensor to a spherical-power adapter that facilitates moving the image sensor relative to an imaging lens within a telecentric lens stack (510). Step 510 may be performed in a variety of ways, including any of those described above in connection with FIGS. 1-4. For example, a testing equipment manufacturer and/or contractor may physically and/or optically couple an image sensor to a spherical-power adapter that facilitates moving the image sensor relative to an imaging lens within a telecentric lens stack.

Method 500 may also include and/or involve the step of coupling at least one optical component to a field-curvature adapter that facilitates adjusting the size of a variable air gap formed between the optical component and at least one additional optical component (520). Step 520 may be performed in a variety of ways, including any of those described above in connection with FIGS. 1-4. For example, a testing equipment manufacturer and/or contractor may physically and/or optically couple at least one optical component to a field-curvature adapter that facilitates adjusting the size of a variable air gap formed between the optical component and at least one additional optical component.

Method 500 may additionally include and/or involve the step of placing the optical component between the image sensor and the imaging lens within the telecentric lens stack (530). Step 530 may be performed in a variety of ways, including any of those described above in connection with FIGS. 1-4. For example, a testing equipment manufacturer and/or contractor may position and/or place the optical component between the image sensor and the imaging lens within the telecentric lens stack.

Method 500 may further include and/or involve the step of configuring, within the telecentric lens stack, a cylindrical-power adapter that includes a plurality of cylindrical correction lenses applied to a wheel that rotates in at least one direction (540). Step 540 may be performed in a variety of ways, including any of those described above in connection with FIGS. 1-4. For example, a testing equipment manufacturer and/or contractor may configure, apply, and/or assemble a cylindrical-power adapter within the telecentric lens stack. In this example, the cylindrical-power adapter may include and/or represent a plurality of cylindrical correction lenses applied to a wheel that rotates in at least one direction.

Example Embodiments

Example 1: An imaging camera device comprising (1) an image sensor, (2) a spherical-power adapter coupled to the image sensor, wherein the spherical-power adapter moves the image sensor relative to an imaging lens, (3) a field-curvature adapter coupled to at least one optical component placed between the image sensor and the imaging lens, wherein the field-curvature adapter adjusts the size of a variable air gap formed between the optical component and at least one additional optical component, and (4) a cylindrical-power adapter that includes a plurality of cylindrical correction lenses applied to a wheel configured to rotate in at least one direction.

Example 2: The imaging camera device of Example 1, further comprising a telecentric lens stack that includes the imaging lens, the optical component, the additional optical component, and the plurality of cylindrical correction lenses.

Example 3: The imaging camera device of Example 1 or 2, wherein the spherical-power adapter is configured to modify an image presented by a display device that is optically coupled to the telecentric lens stack by moving the image sensor relative to the imaging lens, the modification to the image at least partially compensating for a spherical power of a prescription lens through which the image passed prior to reaching the telecentric lens stack.

Example 4: The imaging camera device of any of Examples 1-3, wherein the field-curvature adapter is configured to modify an image presented by a display device that is optically coupled to the telecentric lens stack by adjusting the size of the variable air gap formed between the optical component and the additional optical component, the modification to the image at least partially compensating for a magnification or field-curvature change that occurred upon passing through a prescription lens prior to reaching the telecentric lens stack.

Example 5: The imaging camera device of any of Examples 1-4, wherein the cylindrical-power adapter is configured to modify an image presented by a display device that is optically coupled to the telecentric lens stack by adjusting an axis of at least one of the cylindrical correction lenses applied to the wheel, the modification to the image at least partially compensating for a cylindrical power or cylindrical axis of a prescription lens through which the image passed prior to reaching the telecentric lens stack.

Example 6: The imaging camera device of any of Examples 1-5, wherein the cylindrical-power adapter is configured to modify an image presented by a display device that is optically coupled to the telecentric lens stack by rotating at least one of the cylindrical correction lenses applied to the wheel, the modification to the image at least partially compensating for a cylindrical power or cylindrical axis of a prescription lens through which the image passed prior to reaching the telecentric lens stack.

Example 7: The imaging camera device of any of Examples 1-6, wherein the plurality of cylindrical correction lenses are positioned between the imaging lens and the variable air gap formed by the optical component and the additional optical component within the telecentric lens stack.

Example 8: The imaging camera device of any of Examples 1-7, wherein the imaging lens is optically coupled directly to a display device undergoing testing or calibration in connection with a prescription lens, the optical coupling between the display device and the imaging lens enabling the imaging lens to receive an image directly from the display device.

Example 9: The imaging camera device of any of Examples 1-8, wherein the image sensor is positioned (1) proximate to the variable air gap formed by the optical component and the additional optical component within the telecentric lens stack and (2) opposite to the display device relative to the telecentric lens stack.

Example 10: The imaging camera device of any of Examples 1-9, wherein the plurality of cylindrical correction lenses are positioned within the variable air gap formed by the optical component and the additional optical component within the telecentric lens stack.

Example 11: The imaging camera device of Examples 1-10, wherein the image sensor comprises at least one of a CCD, an active-pixel sensor, or a CMOS sensor.

Example 12: A system comprising (1) a display device and (2) an imaging camera optically coupled to the display device, wherein the imaging camera comprises (A) an image sensor, (B) a spherical-power adapter coupled to the image sensor, wherein the spherical-power adapter moves the image sensor relative to an imaging lens, (C) a field-curvature adapter coupled to at least one optical component placed between the image sensor and the imaging lens, wherein the field-curvature adapter adjusts the size of a variable air gap formed between the optical component and at least one additional optical component, and (D) a cylindrical-power adapter that includes a plurality of cylindrical correction lenses applied to a wheel configured to rotate in at least one direction.

Example 13: The system of Example 12, wherein the imaging camera further comprises a telecentric lens stack that includes the imaging lens, the optical component, the additional optical component, and the plurality of cylindrical correction lenses.

Example 14: The system of Example 12 or 13, wherein the spherical-power adapter of the imaging camera is configured to modify an image presented by a display device that is optically coupled to the telecentric lens stack by moving the image sensor relative to the imaging lens, the modification to the image at least partially compensating for a spherical power of a prescription lens through which the image passed prior to reaching the telecentric lens stack.

Example 15: The system of any of Examples 12-14, wherein the field-curvature adapter of the imaging camera is configured to modify an image presented by a display device that is optically coupled to the telecentric lens stack by adjusting the size of the variable air gap formed between the optical component and the additional optical component, the modification to the image at least partially compensating for a magnification or field-curvature change that occurred upon passing through a prescription lens prior to reaching the telecentric lens stack.

Example 16: The system of any of Examples 12-15, wherein the cylindrical-power adapter is configured to modify an image presented by a display device that is optically coupled to the telecentric lens stack by adjusting an axis of at least one of the cylindrical correction lenses applied to the wheel, the modification to the image at least partially compensating for a cylindrical power or cylindrical axis of a prescription lens through which the image passed prior to reaching the telecentric lens stack.

Example 17: The system of any of Examples 12-16, wherein the cylindrical-power adapter is configured to modify an image presented by a display device that is optically coupled to the telecentric lens stack by rotating at least one of the cylindrical correction lenses applied to the wheel, the modification to the image at least partially compensating for a cylindrical power or cylindrical axis of a prescription lens through which the image passed prior to reaching the telecentric lens stack.

Example 18: The system of any of Examples 12-17, wherein the plurality of cylindrical correction lenses are positioned between the imaging lens and the variable air gap formed by the optical component and the additional optical component within the telecentric lens stack.

Example 19: The system of any of Examples 12-18, wherein the plurality of cylindrical correction lenses are positioned within the variable air gap formed by the optical component and the additional optical component within the telecentric lens stack.

Example 20: A method comprising (1) coupling an image sensor to a spherical-power adapter that facilitates moving the image sensor relative to an imaging lens within a telecentric lens stack, (2) coupling at least one optical component to a field-curvature adapter that facilitates adjusting the size of a variable air gap formed between the optical component and at least one additional optical component, (3) placing the optical component between the image sensor and the imaging lens within the telecentric lens stack, and (4) configuring, within the telecentric lens stack, a cylindrical-power adapter that includes a plurality of cylindrical correction lenses applied to a wheel that rotates in at least one direction.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
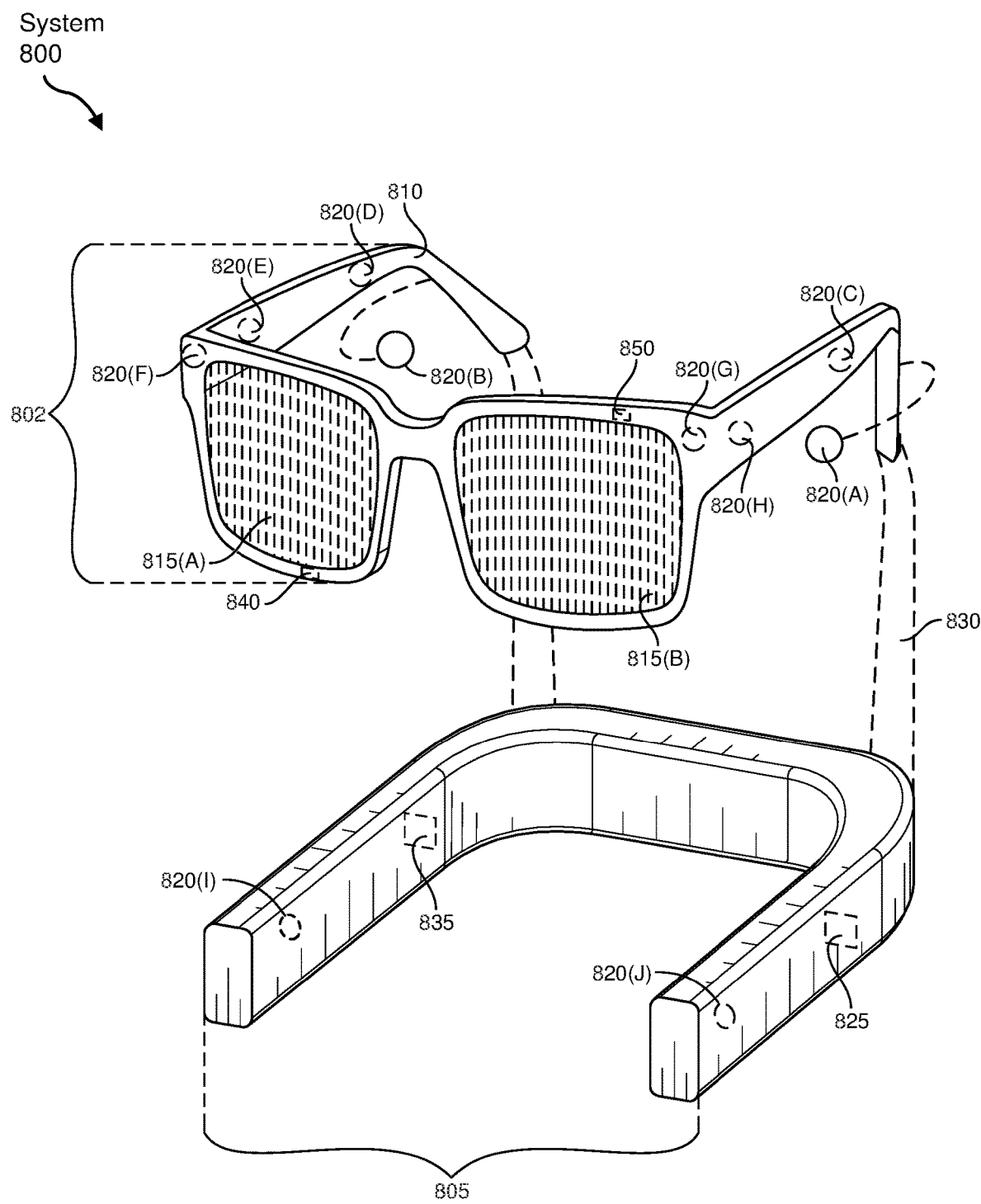
FIG. 8 is an illustration of exemplary augmented-reality glasses that may be used in connection with embodiments of this disclosure.
Figure 9:
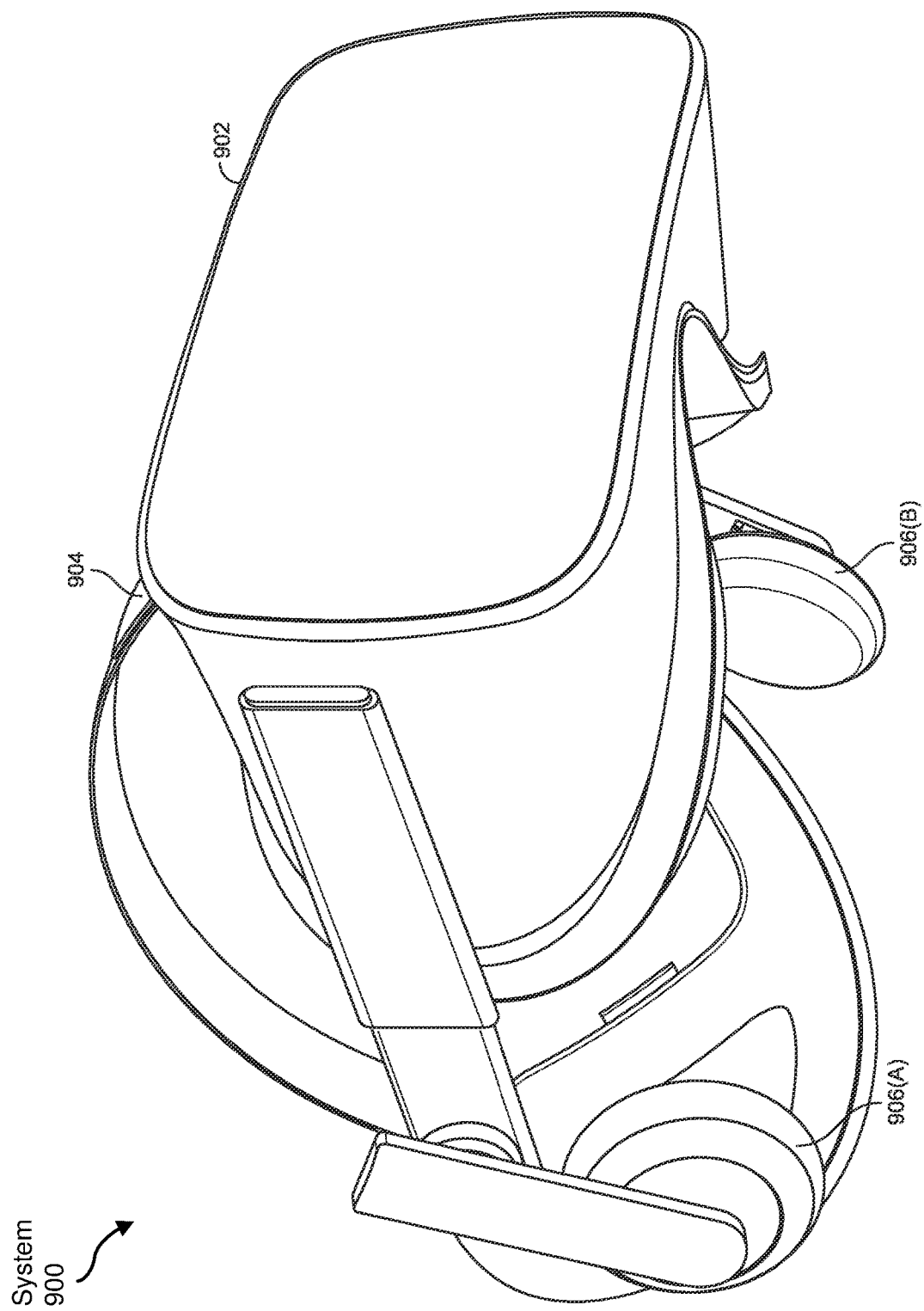
FIG. 9 is an illustration of an exemplary virtual-reality headset that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(I) and 820(J), which may be positioned on a corresponding neckband 805.

In some embodiments, one or more of acoustic transducers 820(A)-(J) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality system 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a BLUETOOTH connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820 (D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable for the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, microLED displays, organic LED (OLED) displays, digital light project (DLP) micro-displays, liquid crystal on silicon (LCOS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 800 and/or virtual-reality system 900 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An imaging camera device comprising:
   an image sensor;
   a spherical-power adapter coupled to the image sensor, wherein the spherical-power adapter moves the image sensor relative to an imaging lens;
   a field-curvature adapter coupled to at least one optical component placed between the image sensor and the imaging lens, wherein the field-curvature adapter adjusts the size of a variable air gap formed between the optical component and at least one additional optical component; and
   a cylindrical-power adapter that includes a plurality of cylindrical correction lenses applied to a wheel configured to rotate in at least one direction.

2. The imaging camera device of claim 1, further comprising a telecentric lens stack that includes:
   the imaging lens;
   the optical component;
   the additional optical component; and
   the plurality of cylindrical correction lenses.

3. The imaging camera device of claim 2, wherein the spherical-power adapter is configured to modify an image presented by a display device that is optically coupled to the telecentric lens stack by moving the image sensor relative to the imaging lens, the modification to the image at least partially compensating for a spherical power of a prescription lens through which the image passed prior to reaching the telecentric lens stack.

4. The imaging camera device of claim 2, wherein the field-curvature adapter is configured to modify an image presented by a display device that is optically coupled to the telecentric lens stack by adjusting the size of the variable air gap formed between the optical component and the additional optical component, the modification to the image at least partially compensating for a magnification or field-curvature change that occurred upon passing through a prescription lens prior to reaching the telecentric lens stack.

5. The imaging camera device of claim 2, wherein the cylindrical-power adapter is configured to modify an image presented by a display device that is optically coupled to the telecentric lens stack by adjusting an axis of at least one of the cylindrical correction lenses applied to the wheel, the modification to the image at least partially compensating for a cylindrical power or cylindrical axis of a prescription lens through which the image passed prior to reaching the telecentric lens stack.

6. The imaging camera device of claim 2, wherein the cylindrical-power adapter is configured to modify an image presented by a display device that is optically coupled to the telecentric lens stack by rotating at least one of the cylindrical correction lenses applied to the wheel, the modification to the image at least partially compensating for a cylindrical power or cylindrical axis of a prescription lens through which the image passed prior to reaching the telecentric lens stack.

7. The imaging camera device of claim 2, wherein the plurality of cylindrical correction lenses are positioned between the imaging lens and the variable air gap formed by the optical component and the additional optical component within the telecentric lens stack.

8. The imaging camera device of claim 7, wherein the imaging lens is optically coupled directly to a display device undergoing testing or calibration in connection with a prescription lens, the optical coupling between the display device and the imaging lens enabling the imaging lens to receive an image directly from the display device.

9. The imaging camera device of claim 8, wherein the image sensor is positioned:
proximate to the variable air gap formed by the optical component and the additional optical component within the telecentric lens stack; and
opposite to the display device relative to the telecentric lens stack.

10. The imaging camera device of claim 2, wherein the plurality of cylindrical correction lenses are positioned within the variable air gap formed by the optical component and the additional optical component within the telecentric lens stack.

11. The imaging camera device of claim 1, wherein the image sensor comprises at least one of:
a charge-coupled device (CCD);
an active-pixel sensor; or
a complementary metal-oxide semiconductor (CMOS) sensor.

12. A system comprising:
a display device; and
an imaging camera optically coupled to the display device, wherein the imaging camera comprises:
an image sensor;
a spherical-power adapter coupled to the image sensor, wherein the spherical-power adapter moves the image sensor relative to an imaging lens;
a field-curvature adapter coupled to at least one optical component placed between the image sensor and the imaging lens, wherein the field-curvature adapter adjusts the size of a variable air gap formed between the optical component and at least one additional optical component; and
a cylindrical-power adapter that includes a plurality of cylindrical correction lenses applied to a wheel configured to rotate in at least one direction.

13. The system of claim 12, wherein the imaging camera further comprises a telecentric lens stack that includes:
the imaging lens;
the optical component;
the additional optical component; and
the plurality of cylindrical correction lenses.

14. The system of claim 13, wherein the spherical-power adapter of the imaging camera is configured to modify an image presented by the display device by moving the image sensor relative to the imaging lens, the modification to the image at least partially compensating for a spherical power of a prescription lens through which the image passed prior to reaching the telecentric lens stack.

15. The system of claim 13, wherein the field-curvature adapter of the imaging camera is configured to modify an image presented by the display device by adjusting the size of the variable air gap formed between the optical component and the additional optical component, the modification to the image at least partially compensating for a magnification or field-curvature change that occurred upon passing through a prescription lens prior to reaching the telecentric lens stack.

16. The system of claim 13, wherein the cylindrical-power adapter is configured to modify an image presented by the display device by adjusting an axis of at least one of the cylindrical correction lenses applied to the wheel, the modification to the image at least partially compensating for a cylindrical power or cylindrical axis of a prescription lens through which the image passed prior to reaching the telecentric lens stack.

17. The system of claim 13, wherein the cylindrical-power adapter is configured to modify an image presented by the display device by rotating at least one of the cylindrical correction lenses applied to the wheel, the modification to the image at least partially compensating for a cylindrical power or cylindrical axis of a prescription lens through which the image passed prior to reaching the telecentric lens stack.

18. The system of claim 13, wherein the plurality of cylindrical correction lenses are positioned between the imaging lens and the variable air gap formed by the optical component and the additional optical component within the telecentric lens stack.

19. The system of claim 13, wherein the plurality of cylindrical correction lenses are positioned within the variable air gap formed by the optical component and the additional optical component within the telecentric lens stack.

20. A method comprising:
coupling an image sensor to a spherical-power adapter that facilitates moving the image sensor relative to an imaging lens within a telecentric lens stack;
coupling at least one optical component to a field-curvature adapter that facilitates adjusting the size of a variable air gap formed between the optical component and at least one additional optical component;
placing the optical component between the image sensor and the imaging lens within the telecentric lens stack; and
configuring, within the telecentric lens stack, a cylindrical-power adapter that includes a plurality of cylindrical correction lenses applied to a wheel that rotates in at least one direction.

* * * * *